United States Patent
Himawan et al.

(10) Patent No.: US 8,984,283 B2
(45) Date of Patent: Mar. 17, 2015

(54) PRIVATE CERTIFICATE VALIDATION METHOD AND APPARATUS

(75) Inventors: Erwin Himawan, Chicago, IL (US); Anthony R. Metke, Naperville, IL (US); Shanthi E. Thomas, Carpentersville, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 263 days.

(21) Appl. No.: 13/197,079

(22) Filed: Aug. 3, 2011

(65) Prior Publication Data

US 2013/0036303 A1    Feb. 7, 2013

(51) Int. Cl.
  H04L 9/32    (2006.01)
  H04L 29/06   (2006.01)
  H04L 9/00    (2006.01)
  G06F 21/00   (2013.01)

(52) U.S. Cl.
  CPC .......... *H04L 9/3268* (2013.01); *H04L 63/0823* (2013.01); *H04L 9/3263* (2013.01)
  USPC .............. 713/158; 713/156; 713/175; 726/5; 726/6; 726/10

(58) Field of Classification Search
  None
  See application file for complete search history.

(56) References Cited

U.S. PATENT DOCUMENTS

| | | | |
|---|---|---|---|
| 6,134,551 A * | 10/2000 | Aucsmith | 1/1 |
| 7,809,941 B1 | 10/2010 | Thurman et al. | |
| 7,814,314 B2 | 10/2010 | Gentry et al. | |
| 7,827,399 B1 | 11/2010 | Sheretov et al. | |
| 2002/0073310 A1 * | 6/2002 | Benantar | 713/156 |
| 2005/0015586 A1 * | 1/2005 | Brickell | 713/156 |
| 2005/0021969 A1 * | 1/2005 | Williams et al. | 713/176 |
| 2005/0278534 A1 * | 12/2005 | Nadalin et al. | 713/175 |
| 2008/0133907 A1 | 6/2008 | Parkinson | |
| 2009/0249062 A1 * | 10/2009 | Thomas et al. | 713/158 |
| 2010/0083347 A1 * | 4/2010 | Hinton | 726/1 |
| 2010/0275015 A1 * | 10/2010 | Zhang et al. | 713/158 |

FOREIGN PATENT DOCUMENTS

| | | |
|---|---|---|
| DE | 10 2009 051206 A1 | 5/2011 |
| EP | 1162783 A2 | 12/2001 |
| WO | 0195555 A1 | 12/2001 |

OTHER PUBLICATIONS

Himanshu Khurana, et al. Enforcing Dependencies Between PKI Certification in Ad-Hoc Networks; Electrical and Computer Engineering Department, University of Maryland; Dec. 2008, 6 Pages.
3GPP TSG-SA 3 Meeting #28; TDOC 53-030234; Berlin, Germany; May 6-9, 2003; 4 Pages.

(Continued)

*Primary Examiner* — Alexander Lagor
(74) *Attorney, Agent, or Firm* — Steven May

(57) ABSTRACT

Methods and apparatuses for validating the status of digital certificates include a relying party receiving at least one digital certificate and determining if the at least one digital certificate is to be validated against a private certificate status database. The relying party accesses the private certificate status database and cryptographically validates the authenticity of data in the private certificate status database. The relying party also validates the at least one digital certificate based on information in at least one of the private certificate status database and a public certificate status database.

20 Claims, 5 Drawing Sheets

(56) References Cited

OTHER PUBLICATIONS

Cooper N. et al., "Internet X.509 Public Key Infrastructure Certificate and Certificate Revocation List (CRL) Profile", 149 pages, (May 1, 2008).

International Search Report and Written Opinion for counterpart International Patent Application No. PCT/US2012/047847 mailed Oct. 30, 2012.

* cited by examiner

PRIVATE CERTIFICATE VALIDATION METHOD AND APPARATUS

FIELD OF THE DISCLOSURE

The present disclosure relates generally to validating digital certificates and more particularly to verifying the status of a digital certificate in a relying party domain against a private certificate status list independent of a revocation status issued by an issuing certificate authority.

BACKGROUND

Public Key Infrastructure (PKI) provides an infrastructure for managing public key used for authenticating messages using public key cryptography. PKI generally allows for management of asymmetric cryptography keys, wherein different keys are used for encryption and decryption. In particular, a pair of keys, one public and one private, is generated for each user. When information is encrypted with the public key, it can be decrypted only with the corresponding asymmetric private key. Accordingly, for example, when a sender of a message uses the public key of a recipient to encrypt the message, the contents of the message can only be read after being decrypted with the recipient's private key. Conversely, the sender may digitally sign the message with the sender's associated private key, wherein the authenticity of the digitally signed message can be verified using the sender's public key. Hence, when the recipient successfully uses the sender's public key to verify information digitally signed with the sender's private key, the recipient can be certain of the sender and the integrity of the information.

To ensure the trustworthiness of public/private keys, certificate authorities (CA) issue digital key certificates that are digitally signed by the CA to guarantee that an individual issued a digital certificate is, in fact, who the individual claims to be. Each digital certificate includes, among other information, the name of the certificate holder, a serial number, an expiration date, the certificate holder's public key, and the digital signature of the issuing CA. This information enables relying parties receiving information signed with the private key associated with the digital certificate to verify the authenticity and integrity of the information.

A relying party is an entity that relies on the validity of a certificate holder's digital certificate to perform cryptographically operations with the certificate holder. Such cryptographic operations may include, for example, encryption, decryption, and source authentication. A certificate holder is an entity to which a digital certificate is issued. One type of certificate that may be issued to a certificate holder is an identify certificate, which binds a public key contained in the certificate to the certificate holder's identity also contained in the certificate. As is known in the art, for any public key there is an associated private key. The certificate holder is typically the only entity to have access to the private key associated with the public key contained in the certificate. This private key is also said to be associated with the certificate. A digital certificate issued to an entity that is no longer trustworthy, or a certificate for which the associated private key may have been used in an unauthorized manner or may have been exposed outside the required crypto-boundary, is known as a compromised digital certificate or a compromised certificate.

In the PKI certificate life cycle, a digital certificate may become invalid when either the certificate expires on the expiration date noted in the digital certificate or if it is revoked prior to its expiration date. For example, if a certificate holder ceases to be trusted or if the certificate holder's private key is compromised, the digital certificate associated with the holder or the holder's public key may be revoked. To revoke the digital certificate, a certificate revocation request needs to be submitted to the issuing CA. As part of processing the revocation request, the issuing CA authenticates the revocation request, and if the authentication is successful, the issuing CA revokes the digital certificate and publishes the revoked certificate in a Certificate Revocation List (CRL). The CRL is also herein referred to as a Certificate Status List or a Certificate Status Database. A CRL may include one or more of a list of certificate identifiers, an associated revocation status, a revocation timestamp, a revocation reason, as well as other information. Any portion of the contents of the CRL is herein referred to as certificate status information. The CRL is signed by the CRL issuer, so that the CRL may be verified cryptographically. The CRL may be as simple as a list of certificate identifiers and a signature. The certificate identifiers may include certificate serial numbers, distinguished names, public key identifies (such as a hash of the public key), and/or any other information associated with the certificate holder that can be used to uniquely identify the revoked certificate.

If the entity submitting the revocation request belongs to the same domain (local domain) as the certificate holder's issuing CA, the certificate revocation process could be instantaneous. However, when the entity submitting the revocation request belongs to a different domain (remote domain or relying party domain) than the certificate holder's issuing CA, there may be difficulties in submitting and/or authenticating the revocation request. In addition, in an adhoc network where there may be no connectivity with the PKI, the revocation request submitted by an adhoc node may not reach the issuing CA in a timely manner.

Upon receiving information cryptographically processed using a private key associated with a digital certificate, a relying party can use the digital certificate to validate the authenticity and integrity of the information. Further, the relying party may choose to validate the certificate by, among other things, obtaining the appropriate CRL to determine if the certificate being validated is listed in the CRL. The issuer of a CRL is called a CRL issuer. Normally the CRL issuer is the same CA which issued the certificate being revoked. It is also possible for the CA to authorize a third party to be an external CRL issuer. In both cases, the same policies may be adhered to and similar mechanisms used to issue the CRL.

When the revocation request policy requires that the issuing CA authenticates each revocation request, the digital certificate being revoked may remain valid for some time while the request is being processed. In this case, all transactions associated with these digital certificates could potentially be untrustworthy while the revocation process is being processed. If a compromised digital certificate is validated while the revocation is being processed, the issuing CA may be subjected to liabilities based on agreements signed with relying parties or other CAs, where there is typically a provision that the issuing CA will promptly update the CRL.

In order to prevent the relying party from accepting the digital certificate as valid while the issuing CA is processing an associated revocation request, the issuing CA may temporarily suspend the digital certificate while the authentication process is being completed. When the relying party receives information secured with a private key associated with a temporarily suspended digital certificate, the relying party will be unable to validate the suspended digital certificate. It should be noted that by temporarily suspending or revoking the digital certificate during the revocation request process, the issuing CA and/or subject of the certificate could be susceptible to denial of service attacks.

These problems can be exacerbated when the entity submitting the revocation request is in a different domain than the issuing CA. For example, if there is a conflict between policies implemented in the domain of the entity submitting the revocation request and the domain of the certificate holder's issuing CA regarding a revocation request, entities in the requestor's domain and the certificate holder's domain may need some time to determine how best to handle the revocation request. Consider a case where the revocation request cannot be processed immediately because the certificate holder violated a policy of the relying party domain. If the certificate holder operated within the constraints of operating policies of the certificate holder's domain, an entity in the certificate holder's domain may not agree that the certificate should be revoked. During the time required to resolve the disagreement, if the issuing CA is configured to temporarily suspend/revoke the certificate, the issuing domain could be susceptible to denial of service attacks. If, on the other hand, the issuing CA is configured to not temporarily suspend/revoke the certificate, the relying party domain may be unable to invalidate the digital certificate associated with the revocation request submitted by the relying party's domain.

Therefore, there is a need for a validation method for a relying party domain to verify the status of a digital certificate against a certificate status list managed by the relying party domain independent of the revocation status managed by the certificate holder's domain CA. The certificate status list managed by the relying party domain is also referred to as a private certificate status list and the certificate status list managed by the certificate holder's domain is also referred to as a public certificate status list.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
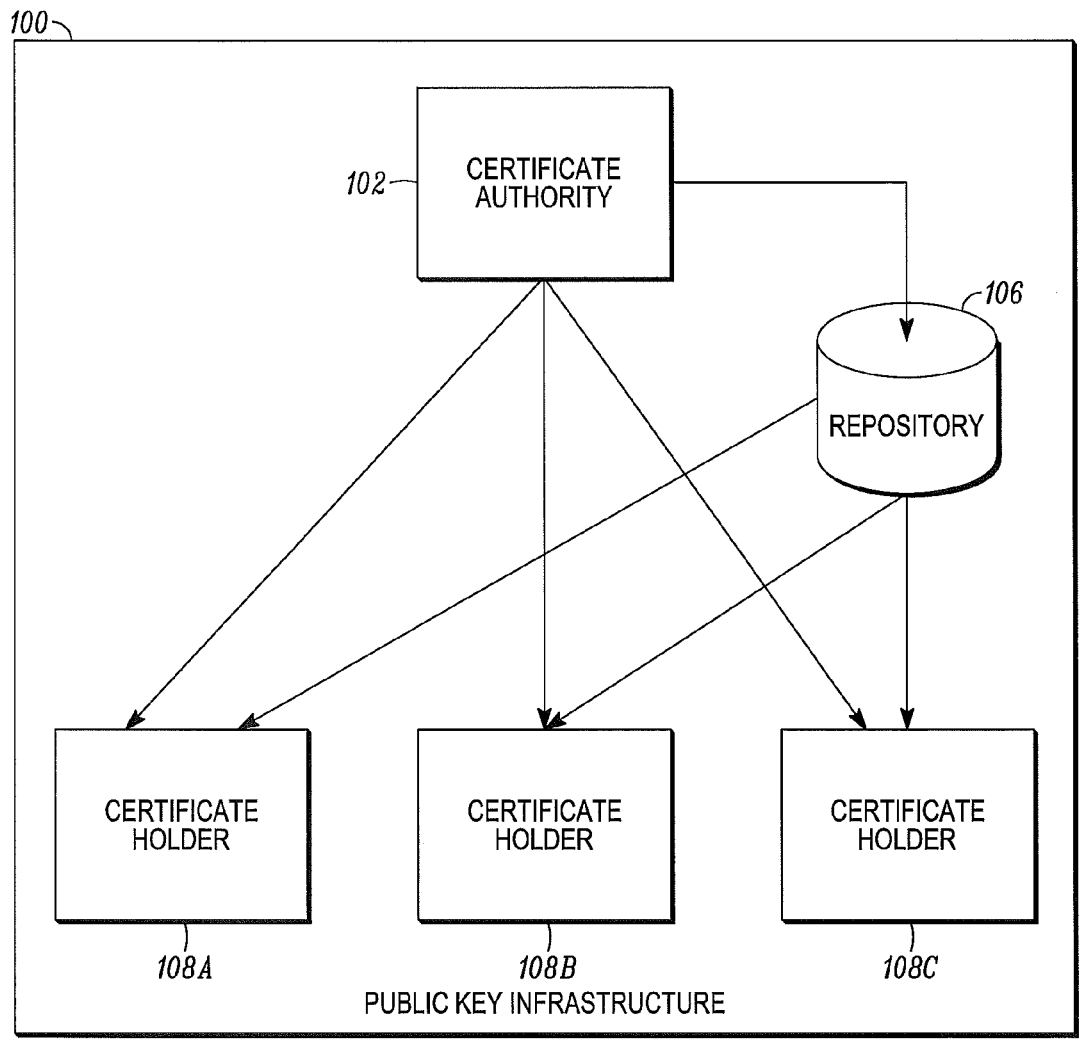
FIG. 1 is a block diagram of a public key infrastructure used in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Some embodiments are directed to methods and apparatuses for validating the status of digital certificates. A relying party receives at least one digital certificate and determines if the at least one digital certificate is to be validated against a private certificate status database. The relying party accesses the private certificate status database and cryptographically validates the authenticity of data in the private certificate status database. The relying party also validates the at least one digital certificate based on information in at least one of the private certificate status database and a public certificate status database.

FIG. 1 is a block diagram of the public key infrastructure used in accordance with some embodiments. A public key infrastructure (PKI) 100 provides public key management. A certificate authority (CA) 102 issues a public key certificate, which attests that a public key embedded in a digital certificate indeed belongs to the certificate holder. It is therefore the obligation of CA 102 to verify the content of the certificate, including the certificate holder's credentials prior to issuing the public key certificate so that others (relying parties) can trust information associated with digital certificates issued by CA 102.

Although only one CA 102 is shown in FIG. 1 for ease of illustration, more than one CA may be included in a PKI. CA 102 may be a commercial CA which issues certificates that may be trusted by web browsers or CA 102 may be associated with a domain, an organization, or government entity, for example. When more than one CA is included in the PKI, trust relationships may exist between the CAs.

In PKI, management of certificates is governed by certification policies. A certification policy (CP) specifies the technical and non-technical requirements and procedures that are used by the PKI to manage the digital certificate lifecycle of an organization or government agency. The CP is issued and maintained by the organization or government agency operating the PKI. The organization or government agency that issues the digital certificate is also known as a certificate holder domain, while the organization or government agency that relies on the digital certificate is also known as a relying party domain. As part of the CP, the PKI of certificate holder domain may make the corresponding public key available (as part of the digital certificate) and store the digital certificate in a publicly accessible repository 106. The certificate holder domain may further authorize CAs operating under its jurisdiction to issue digital certificates to an associated certificate holder/end entity 108a-108c.

The functions of CA 102, the certificate holder domain, the relying party domain, and certificate holder/end entity 108a-108c may be implemented by processors included in, for example, personal computers, servers, or smart phones, that are configured to process data. Therefore, the operations discussed herein as being performed by CA 102, the certificate holder domain, the relying party domain, and certificate holder/end entity 108a-108c may be implemented on the associated processors of CA 102, the certificate holder domain, the relying party domain, and certificate holder/end entity 108a-108c.

Digital certificates issued by CA 102 have a validity period that may be indicated by the certificate's expiry date. A digital certificate's validity may also be revoked if, for example, certificate holder 108a ceases to be trusted, perhaps because the content of the certificate associated with the certificate holder 108*a* has changed. Digital certificates may also be revoked if the corresponding private key is compromised such that signatures made with the private key can no longer be trusted. To revoke the digital certificate, a certificate revocation request is submitted to CA 102. The certificate revocation request may be submitted by entities within or outside the jurisdiction of the certificate holder domain. Before the digital certificate is revoked, CA 102 authenticates the revocation request, and if the authentication is successful, CA 102 revokes the digital certificate and publishes the revoked certificate in a certificate status database. The certificate status database may be a Certificate Revocation List (CRL), an Online Certificate Status Protocol (OCSP) server, or a Server-based Certificate Validation Protocol (SCVP) source, among other options. For ease of reference, the following discussion is directed to the CRL. However, the scope of the discussion herein is equally applicable to any source of certificate status information. At regular intervals, CA 102 updates and issues an updated CRL which includes a list of revoked certificates and the issue date of the CRL. A recent CRL for CA 102 must be checked as part of the digital certificate verification process for all certificates issued by CA 102.

Consider the case where the relying party and the certificate holder belong to different domains. If the entity submitting the certificate revocation request is part of the relying party domain, the certificate holder's domain may take some time to complete the revocation process. To prevent the validation of a digital certificate that is associated with a pending revocation request, but before the digital certificate is added to the CRL by the certificate holder domain, and in one embodiment, the relying party domain is configured to securely prevent the digital certificate from being validated. In particular, relying parties are configured to access a private CRL (P-CRL), in addition to accessing the CRL issued by the certificate holder domain. A P-CRL is a CRL issued by an authorized CRL issuer in the relying party domain. The P-CRL is used to notify the relying parties of those certificates that, although not yet on the issuing CA's CRL, are not trustworthy. The P-CRL therefore includes a list of certificates which are not to be considered valid by relying parties within the relying party's domain. The P-CRL may contain the same content as a standard CRL. The revoked certificates in the P-CRL may belong to end entities in other PKI domains with which the relying party domain has a trust relationship, even if the status of those certificates are not known to be revoked in the other PKI domains.

Figure 2:
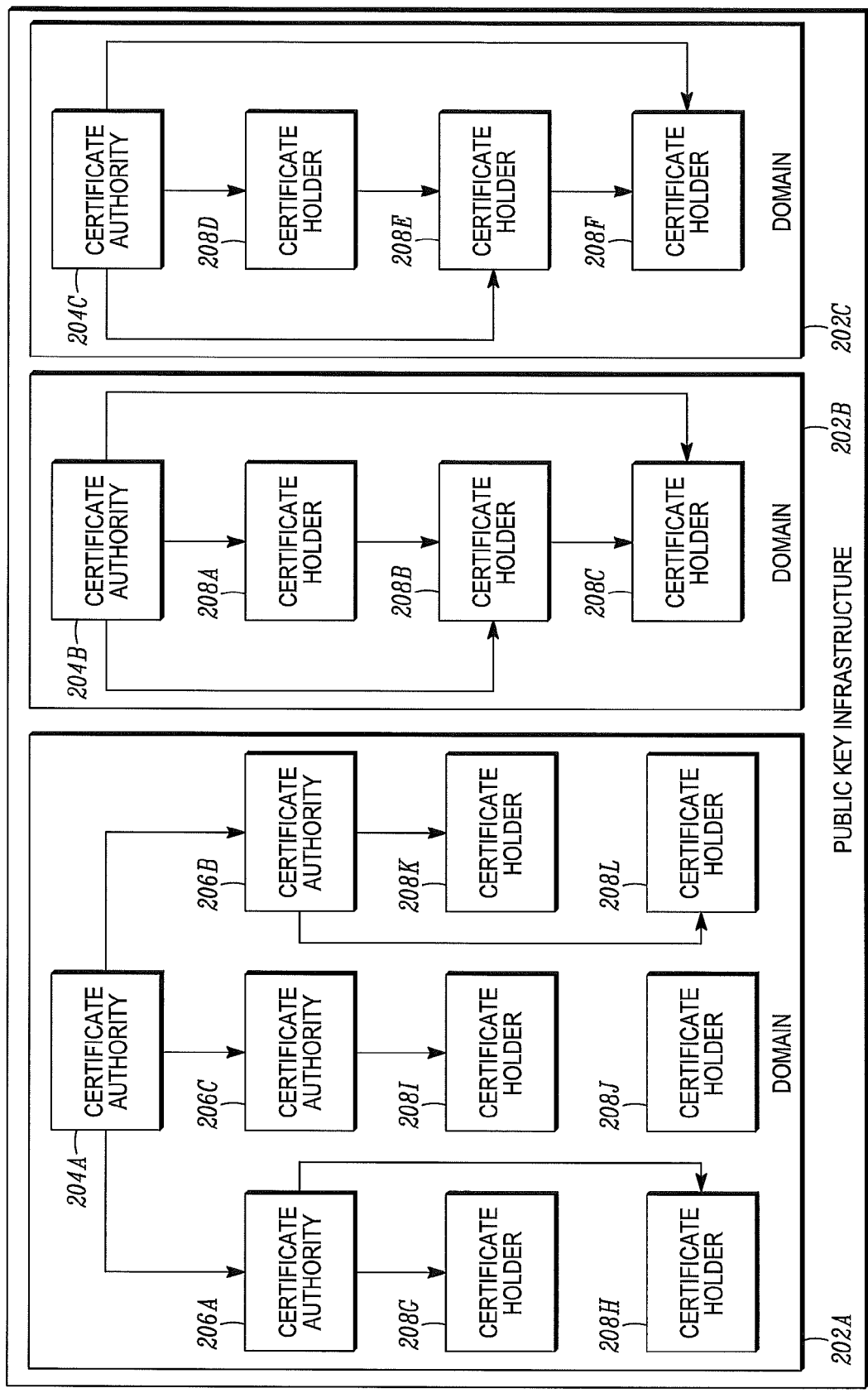
FIG. 2 is a block diagram of a public key infrastructure with multiple domains used in accordance with some embodiments.

FIG. 2 is a block diagram of an example public key infrastructure with multiple domains used in accordance with some embodiments. PKI 200 includes three domains 202*a*-202*c*, each of which operates under certain policies. Domain 202*a* is an example of a domain used for a company with multiple departments. A CA 204*a* associated with an information technology security department in domain 202*a* is configured to operate under a domain-wide policy, and CAs 206*a*-206*c*, associated with divisions within the company (for example, an engineering group, a marketing group, or a human resources group within domain 202*a*), are also configured to operate under PKI policies in accordance with the domain-wide policy. Because the policies of each division are configured to be consistent with the domain-wide policy, CA 202*a* can control and manage all division PKIs. CAs 206*a*-206*c* issue digital certificates to certificate holders 208*g*-208*l*. Domain 202*b* is an example of a domain used for a company with multiple certificate holders 208*a*-208*c*. CA 204*b* is configured to operate under the domain-wide policy for domain 202*b* and to issue digital certificates to certificate holder 208*a*-208*c*. Domain 202*c* is an example of a domain which includes a commercial CA 204*c* which is configured to issue certificates directly to certificate holders 208*d*-208*f*.

Digital certificates are verified using a chain of trust. A trust anchor for a digital certificate is the root CA associated with the digital certificate. For example, the trust anchor in domain 202*a* is CA 204*a*. Domain 202*a* CA topology is configured in the form of a tree structure. A root certificate is the top-most certificate of the tree and the private key of CA 204*a* is used to "sign" the direct descendant "intermediate" CA certificates in the trust chain. All certificates immediately below the root certificate inherit the trustworthiness of the root certificate. Certificates further down the tree also depend on the trustworthiness of respective intermediate CAs. A trust path is formed from a sequence of certificates starting from a self-signed root CA certificate and ending at certificate holder's certificate. The sequence may include one or more intermediate CA certificates. Each subsequent certificate in the sequence is signed by the CA associated with the previous certificate in the sequence.

In a system where a relying party is part of the PKI domain for which the root of trust is managed by a centralized authority, for example CA 204*a*, the relying party's P-CRL could be issued by the trust anchor, i.e., an entity authorized by the relying party's trust management authority to issue the P-CRL. In a system where the relying party independently manages its own root of trust, each relying party may manually configure and maintain its own P-CRL. For example, in domain 202*c*, each of certificate holders 208*d*-208*f* may manually configure and maintain its own P-CRL.

To distinguish the CRL from P-CRL, the P-CRL includes a PrivateCRL attribute which indicates that the P-CRL is issued by an entity authorized by the relying party's PKI domain. The P-CRL issuer may not necessarily have the authorization from the certificate holder's PKI domains to place entities administered by the certificate holder's PKI domains on the P-CRL. However, the creation of the P-CRL is authorized by the relying party's trust authority and relying parties in the relying party PKI domain can therefore use the P-CRL to identify the revocation/validation status of digital certificates. The relying party uses its trust anchor signature to check the P-CRL integrity and to authenticate the P-CRL issuer. The relying party is also configured to cryptographically validate the P-CRL, for example, by using a digital signature or a Message Authentication Code (MAC).

There are times when the relying party may or may not need to check the P-CRL when validating the digital certificate. To enable the relying party to know when it must check the P-CRL, the relying party may be configured to access a local database which specifies a range of distinguished names for end entities or CAs, such that if any certificates in a chain being validated are in the specified range, the certificates in the chain must be compared with a specified P-CRL. In one example, names can be expressed as a range by specifying a portion of a full name. For example, the domain name system includes a set of name components that together specifies a fully qualified domain name for a network resource. By specifying a subset of components of the fully qualified domain name, either alone or together with a wildcard identifier, a range of names can be specified. In another example, in a messaging standard such as the X.400 standard, a set of name components known as Relative Distinguished Name (RDN) together specify a distinguished name for a network resource. By specifying a subset of components of the distinguished name, either alone or together with a wildcard identifier, a range of names can also be specified.

Additionally or alternatively, a certificate extension, called a Private CRL Distribution Point (P-CRL-DP) extension could be used to indicate the need to validate the certificate against a P-CRL. The P-CRL-DP may contain a pointer to the required P-CRL. The P-CRL-DP extension may also herein referred to as a Private Certificate Status Extension. In particular, a marking associated with the P-CRL-DP extension could be used to indicate when the relying party may or may not need to check the P-CRL during validation of the digital certificate. For example, the P-CRL extension could be marked as critical when the relying party is required to check the P-CRL during validation of the digital certificate.

The relying party could be preconfigured to access a locally stored P-CRL-DP extension or the P-CRL-DP extension could be embedded in any intermediary CA certificate which forms a trust path between a certificate subject and the relying party's trust anchor. In other words, during certificate validation, when the relying party determines that any of the certificates in the trust path has the P-CRL-DP extension, the relying party is configured to access the P-CRL pointed to by the P-CRL-DP extension as part of the certificate validation process. If multiple P-CRL-DP extensions are contained in one path, then the relying party is configured to access the P-CRL pointed to by each P-CRL-DP extension.

The P-CRL-DP extension is advantageous when two disparate PKI domains establish an inter-domain trust relationship. In this scenario, the relying party's principal CA (a CA which is designated to establish the inter-domain trust relationship with another certificate holder's domain CA) may include the P-CRL-DP extension in a cross-signed certificate issued to another certificate holder domain's CA. Thereafter, when the relying party processes the inter-domain cross-sign certificate (the issuer of the cross-sign certificate is relying party's domain principal CA), the relying party will know that all of the certificates issued by the certificate holder's PKI domains are subject to verification against the relying party's domain P-CRL.

The value of the P-CRL-DP extension could be used to indicate the P-CRL's location and the authorized issuer. In particular, the value of the P-CRL-DP extension could be used to indicate whether the P-CRL is locally or remotely created and stored. For example, if the P-CRL-DP extension value is "localhosts" or an Internet Protocol (IP) address such as "127.0.0.1", the relying party is authorized to create and store its own P-CRL locally. The "localhosts" or "127.0.0.1" value is applicable to a relying party which manages its own root of trust, for example, certificate holders $208d$-$208f$. If the relying party's root of trust is managed by a centralized authority, for example CA $204a$, the P-CRL-DP extension value is configured to include a uniform resource locator/uniform resource identifier (URL/URI) of the relying party's domain P-CRL. For example, the URI in the P-CRL-DP extension may direct the relying party directly to the location of P-CRL, to an OCSP responder, or to the SCVP server that has access to the P-CRL. It is commonly known that URI can be used to identify and locate a network resource such as a private certificate status database.

Figure 3:
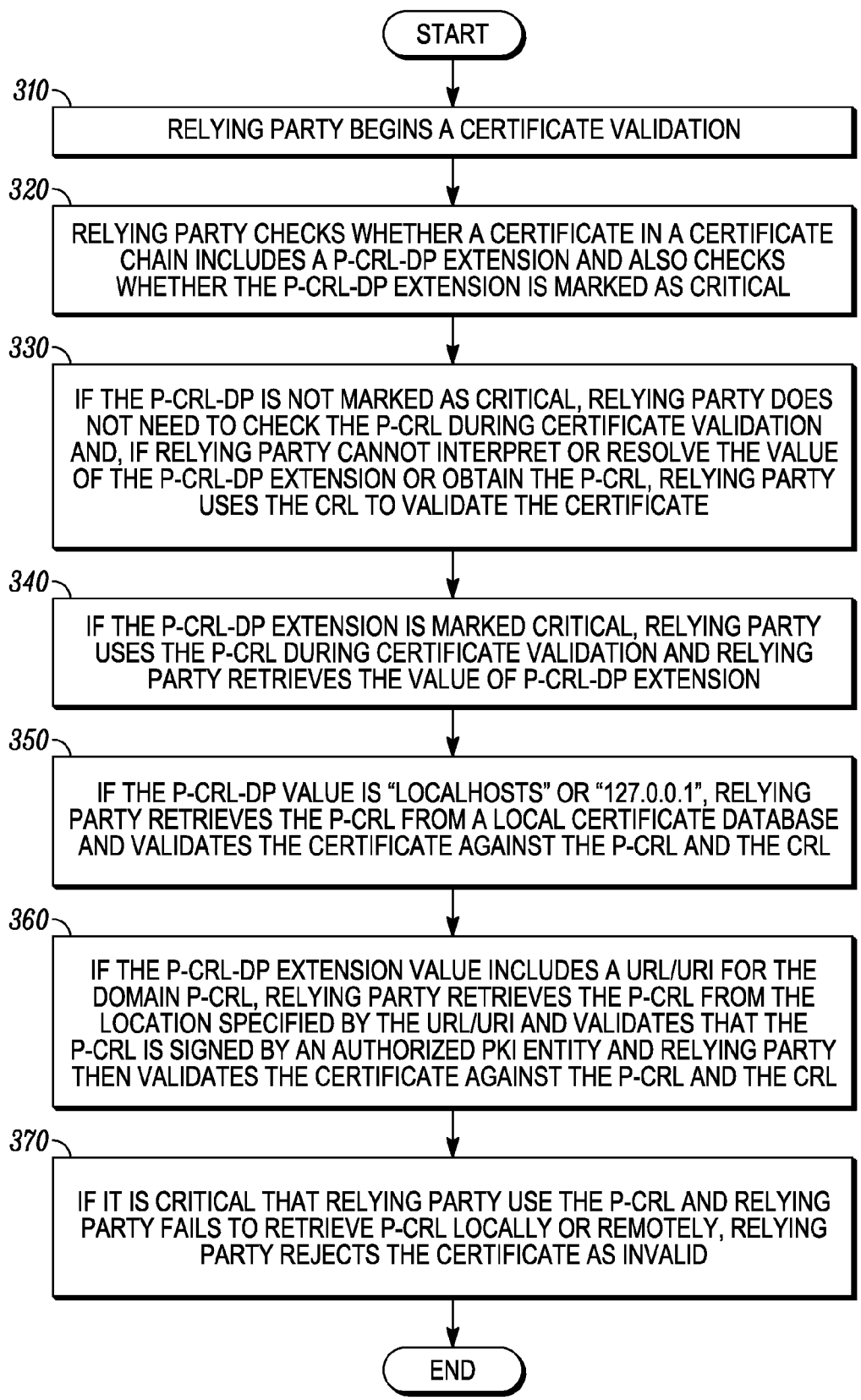
FIG. 3 is a flow diagram of a certificate validation rule that incorporates use of a private certificate revocation list in accordance with some embodiments.

FIG. 3 is a flow diagram of a certificate validation rule that incorporates use of P-CRL in accordance with some embodiments. In 310, the relying party begins a certificate validation. In 320, the relying party checks whether a certificate in a certificate chain includes a P-CRL-DP extension and also checks whether the P-CRL-DP extension is marked as critical. A certificate chain is a sequence of certificates starting from a self-signed root CA certificate and ending at a certificate holder's certificate. The sequence may include one or more intermediate CA certificates. Each subsequent certificate in the sequence is signed by the CA associated with the previous certificate in the sequence. In 330, if the P-CRL-DP is not marked as critical, and, if the relying party cannot interpret or resolve the value of the P-CRL-DP extension or obtain the P-CRL, the relying party does not need to check the P-CRL during certificate validation. The relying party uses the CRL to validate the certificate. In 340, if the P-CRL-DP extension is marked critical, the relying party uses the P-CRL during certificate validation and the relying party retrieves the value of the P-CRL-DP extension. In 350, if the P-CRL-DP value is, for example, "localhosts" or "127.0.0.1", the relying party retrieves the P-CRL from a local certificate database and validates the certificate against the P-CRL and the CRL. In 360, if the P-CRL-DP extension value includes a URL/URI for the domain P-CRL, the relying party retrieves the P-CRL from a location specified by the URL/URI and validates that the P-CRL is signed by an authorized PKI entity. The relying party then validates the certificate against the P-CRL and the CRL. In 370, if it is critical that the relying party use the P-CRL and the relying party fails to retrieve P-CRL locally or remotely, the relying party is configured to reject the certificate as invalid.

Figure 4:
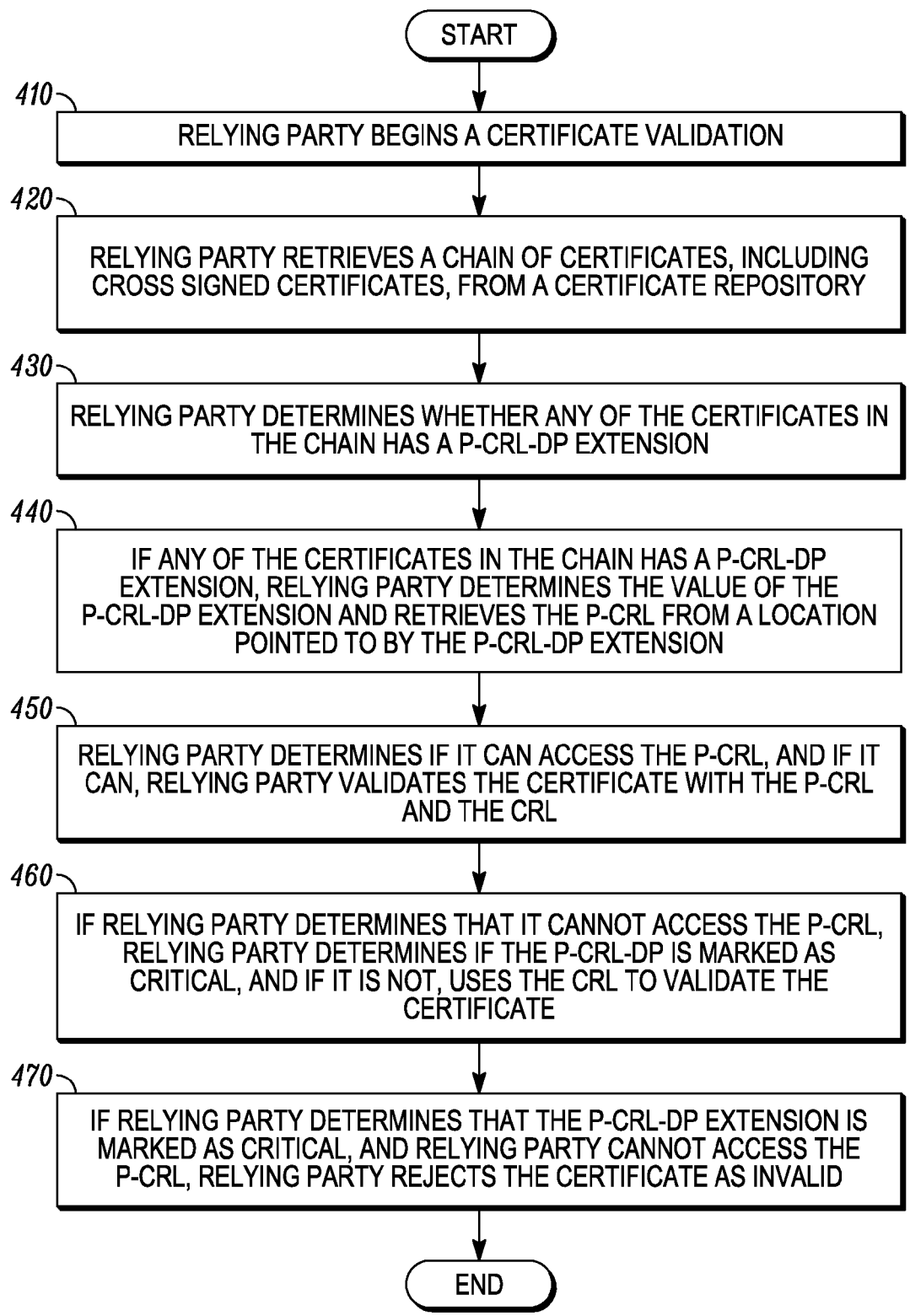
FIG. 4 is a flow diagram of a validation rule used in accordance with some embodiments.

FIG. 4 is a flow diagram of a validation rule used in accordance with some embodiments. In 410, the relying party begins a certificate validation. In 420, the relying party retrieves a chain of certificates, including cross signed certificates, from a certificate repository. In 430, the relying party determines whether any of the certificates in the chain has a P-CRL-DP extension. In 440, if any of the certificates in the chain has a P-CRL-DP extension, the relying party determines the value of the P-CRL-DP extension and retrieves the P-CRL from a location pointed to by the P-CRL-DP extension. In 450, the relying party determines if it can access the P-CRL, and if it can, the relying party validates the certificate with the P-CRL and the CRL. In 460, if the relying party determines that it cannot access the P-CRL, the relying party determines if the P-CRL-DP extension is marked as critical, and if it is not, the relying party uses the CRL to validate the certificate. In 470, if the relying party determines that the P-CRL-DP extension is marked as critical, and the relying party cannot access the P-CRL, the relying party rejects the certificate as invalid.

Alternatively, when the relying party determines that the online private certificate status database is inaccessible, the relying party may use a cached version of the private certificate status to obtain the validation status of at least one digital certificate.

Figure 5:
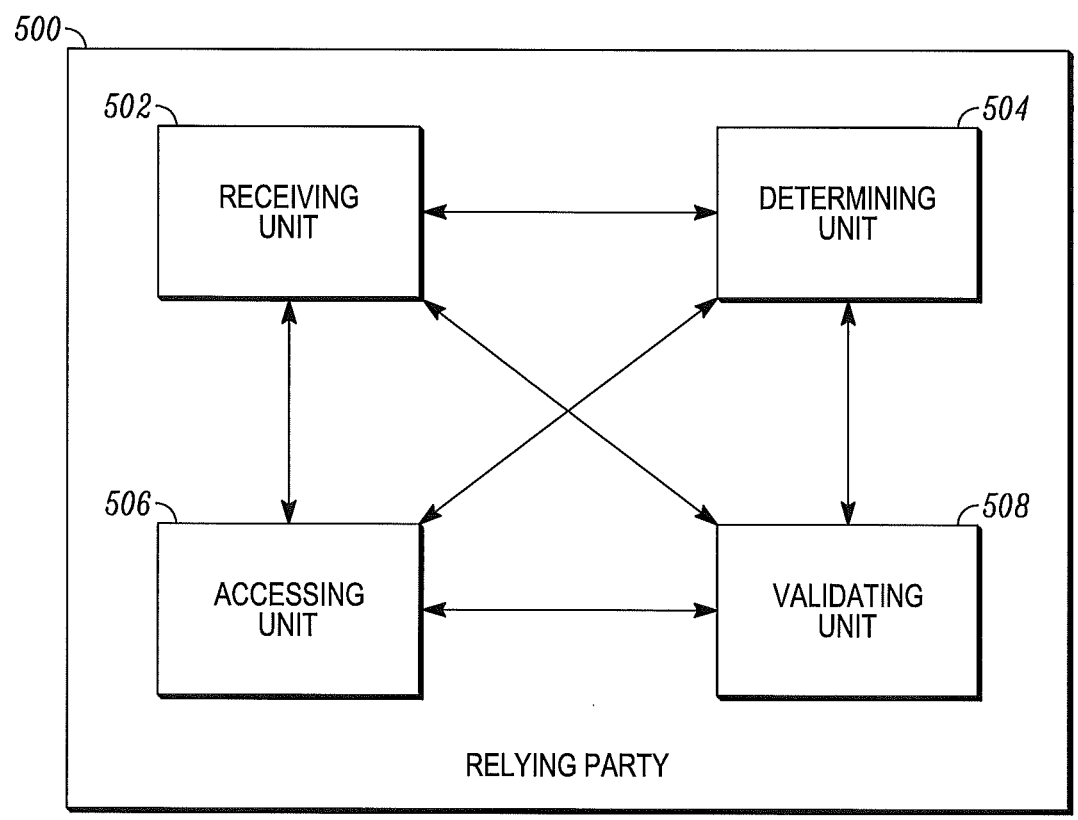
FIG. 5 is a block diagram of components of a relying party in accordance with some embodiments.

FIG. 5 is a block diagram of a relying party in accordance with some embodiments. Relying party 500 is configured to validate that a received digital certificate is not listed in or associated with a private certificate revocation list. The relying party includes one or more processors for executing the functions of a receiving unit 502 configured to receive at least one digital certificate; a determining unit 504 configured to determine if the at least one digital certificate is to be validated against a private certificate status database; an accessing unit 506 configured to access the private certificate status database based on a value contained in a private certificate status extension; and a validating unit 508 configured to validate the at least one digital certificate based on information in at least one of the private certificate status database and a public certificate status database, depending on a marking associated with the private certificate status extension. The relying party also includes a computer-readable medium including software code that, when executed by the one or more processors for executing the functions of the relying party, causes the processor(s) to implement the methods disclosed herein.

In the foregoing specification, specific embodiments have been described. However, one of ordinary skill in the art should appreciate that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for validating a revocation status of digital certificates, the method comprising:

receiving, by a relying party, at least one digital certificate;

determining, by the relying party, if the at least one digital certificate is to be validated against a private certificate revocation status database within the relying party's domain in addition to a public certificate revocation status database belonging to a different domain than the relying party's domain, revocation statuses maintained at the private certificate revocation status database being independent of revocation statuses maintained at the public certificate revocation status database; and responsive to determining by the relying party, that the at least one digital certificate is to be validated against the private certificate revocation status database in addition to the public certificate revocation status database:

accessing, by the relying party, the private certificate revocation status database within the relying party's domain to determine if the at least one digital certificate is considered valid by the relying party's domain;

accessing, by the relying party, the public certificate revocation status database to determine if the at least one digital certificate is considered valid by the different domain;

validating, by the relying party, the revocation status of the at least one digital certificate based on information in both of the private certificate revocation status database and the public certificate revocation status database;

wherein validating the revocation status based on information in the private certificate revocation status database comprises utilizing an attribute included in the private certificate revocation status database indicating that the listing of certificate revocation statuses in the private certificate revocation status database is issued by an entity authorized by the relying party's domain; and utilizing, by the relying party, a trust anchor signature to check the integrity of the listing of certificate revocation statuses in the private certificate revocation status database and to authenticate an issuer of the listing of certificate revocation statuses.

2. The method of claim 1, wherein determining that the at least one digital certificate is to be validated against the private certificate revocation status database in addition to the public certificate revocation status database comprises determining that the at least one digital certificate is in a certificate chain between a certificate holder and a trusted certificate authority in the relying party's domain and that at least one certificate in the certificate chain includes a private certificate revocation status extension.

3. The method of claim 2, wherein the private certificate revocation status extension comprises a uniform resource identifier of the private certificate revocation status database within the relying party's domain.

4. The method of claim 2, wherein the accessing further comprises determining, by the relying party, that the private certificate revocation status database is inaccessible and that the private certificate revocation status extension is not marked as critical, and responsively validating the at least one digital certificate based on the information in the public certificate revocation status database.

5. The method of claim 2, wherein the accessing further comprises determining, by the relying party, that the private certificate revocation status database is inaccessible and that the private certificate revocation status extension is marked as critical, and responsively aborting the validating of the at least one digital certificate and rejecting the at least one digital certificate as invalid.

6. The method of claim 1, wherein the accessing further comprises determining, by the relying party, that the private certificate revocation status database is inaccessible and responsively using a locally cached version of the private certificate revocation status database to validate the at least one digital certificate in combination with the information from the public certificate revocation status database.

7. The method of claim 1, wherein information in the private certificate revocation status database identifies a digital certificate issued in the different domain and the at least one digital certificate is associated with a pending revocation request issued by the relying party's domain.

8. The method of claim 1, further comprising using, by the relying party, a trusted certificate authority signature to authenticate and check the integrity of the private certificate revocation status database, wherein the private certificate revocation status database is maintained by the relying party's domain.

9. The method of claim 1, further comprising configuring and maintaining the private certificate revocation status database by sending a revocation request to the different domain, and automatically adding certificate information associated with the revocation request to the private certificate revocation status database.

10. The method of claim 1, wherein the determining further comprises accessing a local database that specifies a range of names of a certificate holder, and responsive to determining that the at least one digital certificate is in the specified range, the at least one digital certificate is compared with information in the private certificate revocation status database in addition to the public certificate revocation status database.

11. The method of claim 1, further comprising cryptographically validating, by the relying party, the authenticity of data in the private certificate revocation status database.

12. A relying party processor configured to:
receive, via a receiving unit, at least one digital certificate;
determine, via a determining unit, whether the at least one digital certificate is to be validated against a private certificate revocation status database within the relying party's domain in addition to a public certificate revocation status database belonging to a different domain than the relying party's domain, revocation statuses maintained at the private certificate revocation status database being independent of revocation statuses maintained at the public certificate revocation status database;
responsive to the determining unit determining that the at least one digital certificate is to be validated against the private certificate revocation status database in addition to the public certificate revocation status database:
  access, via an accessing unit, the private certificate revocation status database within the relying party's domain to determine if the at least one digital certificate is considered valid by the relying party's domain;
  access, via the accessing unit, the public certificate revocation status database to determine if the at least one digital certificate is considered valid by the different domain;
  validate, via a validating unit, the revocation status of the at least one digital certificate based on information in both the private certificate revocation status database and the public certificate revocation status database;
  wherein validating the revocation status based on information in the private certificate revocation status database comprises utilizing an attribute included in the private certificate revocation status database indicating that the listing of certificate revocation statuses in the private certificate revocation status database is issued by an entity authorized by the relying party's domain; and
utilize a trust anchor signature to check the integrity of the listing of certificate revocation statuses in the private certificate revocation status database and to authenticate an issuer of the listing of certificate revocation statuses.

13. The relying party processor of claim 12, wherein the processor is configured to determine that the at least one digital certificate is to be validated against the private certificate revocation status database in addition to the public certificate revocation status database by determining that the at least one digital certificate is in a certificate chain between a certificate holder and a trusted certificate authority in the relying party's domain and that at least one certificate in the certificate chain includes a private certificate revocation status extension; and
  wherein the processor is further configured to determine, via the accessing unit, that the private certificate revocation status database is inaccessible and that the private certificate revocation status extension is not marked as critical, and the processor is further configured to, via the validating unit, validate the at least one digital certificate based on the information in the public certificate revocation status database.

14. The relying party processor of claim 12, wherein the processor is configured to determine that the at least one digital certificate is to be validated against the private certificate revocation status database in addition to the public certificate revocation status database by determining that the at least one digital certificate is in a certificate chain between a certificate holder and a trusted certificate authority in the relying party's domain and that at least one certificate in the certificate chain includes a private certificate revocation status extension; and wherein the processor is further configured to determine, via the accessing unit, that the private certificate revocation status database is inaccessible and that the private certificate revocation status extension is marked as critical, and the processor is further configured to, via the validating unit, abort validation of the at least one digital certificate and reject the at least one digital certificate as invalid.

15. The relying party processor of claim 12, wherein the processor is further configured to determine, via the accessing unit, that the private certificate revocation status database is inaccessible, and the processor is further configured to, via the validating unit, use a cached version of the private certificate revocation status database to validate the at least one digital certificate.

16. The relying party processor of claim 12, wherein the processor is further configured to use a trusted certificate authority signature to authenticate and check the integrity of the private certificate revocation status database, wherein the private certificate revocation status database is maintained by the relying party domain.

17. The relying party processor of claim 12, wherein the processor is further configured to maintain the private certificate revocation status database by sending a revocation request to the different domain and automatically add certificate information associated with the revocation request to the private certificate revocation status database.

18. The relying party processor of claim 12, wherein the processor is further configured to access, via the determining unit, a local database that specifies a range of names of a certificate holder, and responsive to determining that the at least one digital certificate is in the specified range, the at least one digital certificate is compared with information in the private certificate revocation status database in addition to the public certificate revocation status database.

19. A non-transitory computer-readable medium including software code that, when executed by a processor, causes the processor to implement a method for validating a revocation status of a digital certificate, the method comprising:

receiving, by a relying party, at least one digital certificate;

determining, by the relying party, if the at least one digital certificate is to be validated against a private certificate revocation status database within the relying party's domain in addition to a public certificate revocation status database belonging to a different domain than the relying party's domain, revocation statuses maintained at the private certificate revocation status database being independent of revocation statuses maintained at the public certificate revocation status database; and responsive to determining by the relying party, that the at least one digital certificate is to be validated against the private certificate revocation status database in addition to the public certificate revocation status database:

accessing, by the relying party, the private certificate revocation status database within the relying party's domain to determine if the at least one digital certificate is considered valid by the relying party's domain;

accessing, by the relying party, the public certificate revocation status database to determine if the at least one digital certificate is considered valid by the different domain;

validating, by the relying party, the revocation status of the at least one digital certificate based on information in both of the private certificate revocation status database and the public certificate revocation status database; and wherein validating the revocation status based on information in the private certificate revocation status database comprises utilizing an attribute included in the private certificate revocation status database indicating that the listing of certificate revocation statuses in the private certificate revocation status database is issued by an entity authorized by the relying party's domain; and utilizing, by the relying party, a trust anchor signature to check the integrity of the listing of certificate revocation statuses in the private certificate revocation status database and to authenticate an issuer of the listing of certificate revocation statuses.

20. The relying party processor of claim 12, wherein the processor is further configured to cryptographically validate the authenticity of data in the private certificate revocation status database.

* * * * *